J. J. WOHLGEMUTH.
TIRE VULCANIZING CORE.
APPLICATION FILED JAN. 9, 1919.
1,317,850.
Patented Oct. 7, 1919.
2 SHEETS—SHEET 1.
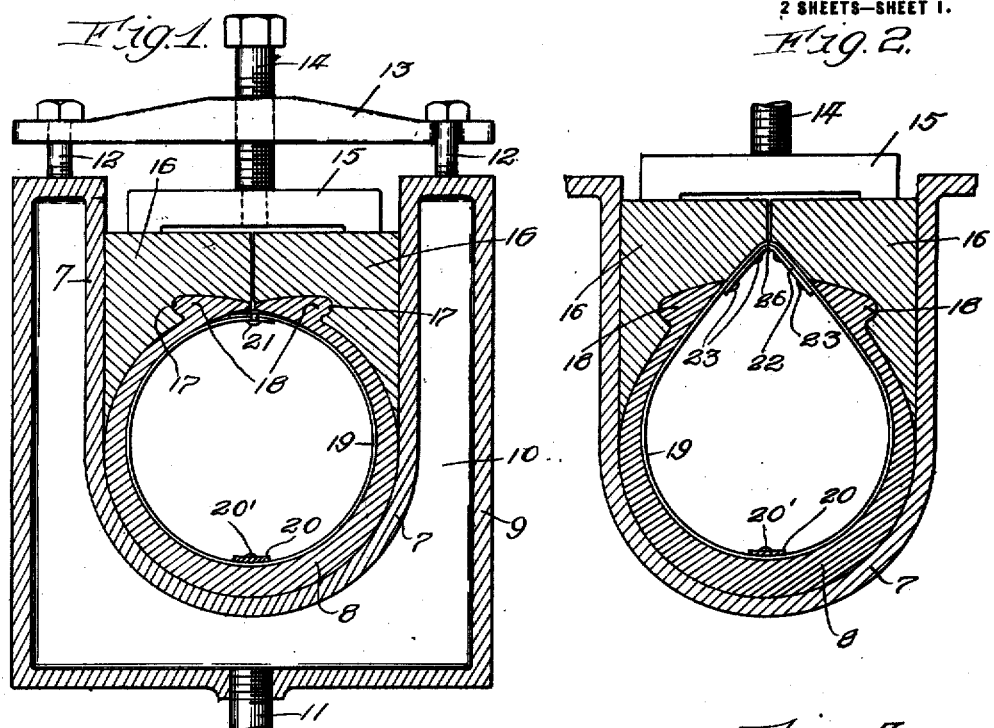
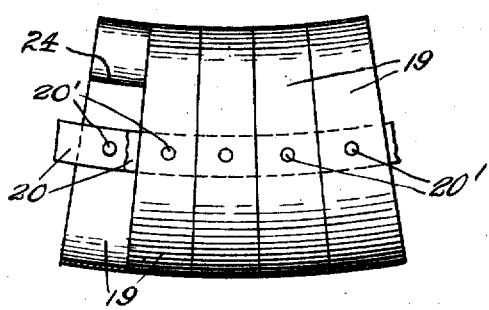
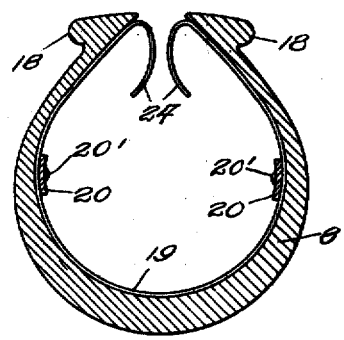
Inventor,
Jacob J. Wohlgemuth,
By Brown & Nissen
Attys

J. J. WOHLGEMUTH.
TIRE VULCANIZING CORE.
APPLICATION FILED JAN. 9, 1919.

1,317,850.

Patented Oct. 7, 1919.
2 SHEETS—SHEET 2.

Witness:
Inventor,
Jacob J. Wohlgemuth,
By Brown & Nissen
Attys.

UNITED STATES PATENT OFFICE.

JACOB J. WOHLGEMUTH, OF CHICAGO, ILLINOIS.

TIRE-VULCANIZING CORE.

1,317,850.        Specification of Letters Patent.        Patented Oct. 7, 1919.

Application filed January 9, 1919. Serial No. 270,268.

*To all whom it may concern:*

Be it known that I, JACOB J. WOHLGEMUTH, a citizen of the United States, residing at Chicago, in the county of Cook and State of Illinois, have invented certain new and useful Improvements in Tire-Vulcanizing Cores, of which the following is a specification.

My invention relates to cores for use in repairing and vulcanizing pneumatic tire casings, and has for its object the provision of a simple and efficient device of this character and one which will be economical and simple in use.

Other objects will appear hereinafter.

An embodiment of my invention is shown in the accompanying drawings, forming a part of this specification, and in which—

Figure 1 is a cross-section of a tire mold with a tire in the mold and a core in the tire which embodies my invention;

Fig. 2 is a view similar to Fig. 1 but showing a modified form of core and parts of the apparatus shown in Fig. 1 broken away;

Fig. 3 is a side view of an end portion of my core member;

Fig. 4 is a cross-section of a tire showing a slightly modified form of tire core embodying my invention;

Figure 5:
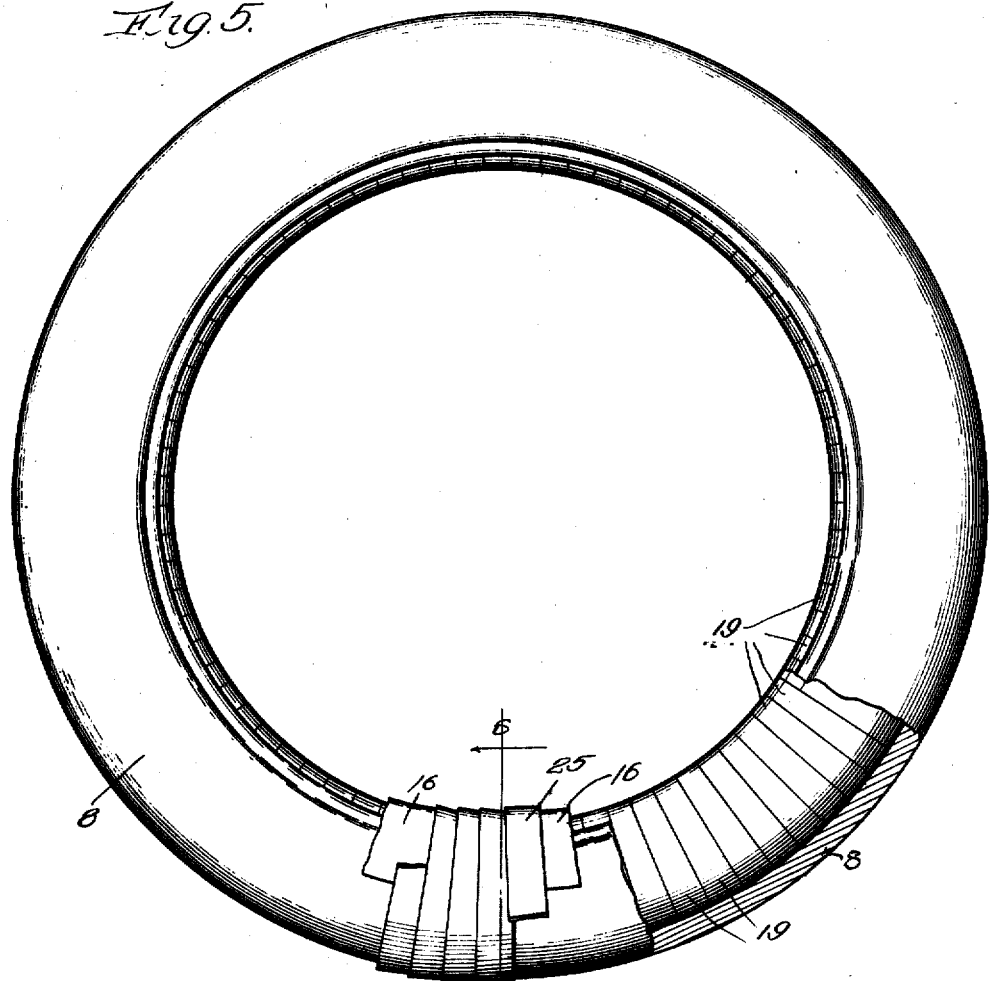
Fig. 5 is a side view of a complete outer casing or tire with a tire core embodying my invention and means for clamping the tire around the core, portions of which are broken away to show underlying parts.

Referring more particularly to the drawings, in Figs. 1 and 2 I have shown a cross-section of a repairing tire mold such as are used in retreading and repairing presses for outer casings of vehicle tires. The tire mold comprises an inner wall 7 adapted to fit the tread portion of an outer casing 8 and a jacket 9 adapted to inclose a steam or other heating agent chamber 10 between the inner wall 7 and outer wall 9. The mold is equipped with means for circulating a heating medium through it in the usual or any preferred manner, the discharge pipe 11 of which is indicated near the bottom of Fig. 1. At the top of the wall 9 is provided two studs 12 which are adapted to engage the ends of the yoke 13. The latter carries a screw 14 threaded therein. The lower end of the screw 14 is adapted to press against a plate 15, and the latter to press a plurality of side flanges 16 downwardly toward the bottom of the inner wall 7. Preferably two side flanges 16 are used, but any other desirable number may be employed when so desired. The mold having its inner wall 7 and the side flanges are preferably fashioned to engage a sector of a tire 8. Ordinarily they are fashioned to engage about one-third of an annular tire 8, but may be made shorter or longer as desired.

The side flanges 16 are provided with bead grooves 17 which are adapted to fit the beads 18 of the tire 8. The parts already described may be such as are now in use, or arranged to accommodate any specific desires. My improvement relates to the core adapted to be used inside of the tire to resist the downward pressure of the flanges 16 in order to press the tire intimately into contact with the flanges and inner wall 7. I preferably make up the core of a plurality of sheet metal springs 19 which are attached together in any desirable manner. In Figs. 1, 2, 3 and 6 I have shown a single bar 20 riveted to these spring members 19, and this bar being located near the tread portion of the tire 8, it will be apparent, however, that this bar 20 may be secured to the springs 19 in any desirable position, or that more than one bar 20 may be used if desired, an instance of which is shown in Fig. 4 in which two bars 20 are used.

Figure 6:
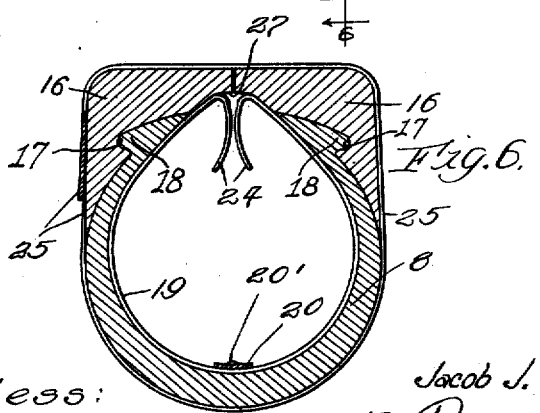
Fig. 6 is an enlarged section taken on line 6—6 of Fig. 5.

The end portions of the spring members 19 are fashioned or otherwise provided with means to prevent their ends overlapping each other when pressure is applied to the flanges 16 in use. In Fig. 1 I have shown the springs 19 as being substantially cylindrical with a rivet 21 passing through the end portions of each spring 19. In Fig. 2 I have shown the ends of the spring member 19 as abutting each other with a plate 22 secured by a plurality of rivets 23 to the end portions of the springs. In Figs. 4 and 6 I have shown the end portions 24 of the springs 19 bent inwardly and adapted to engage each other when pressure is applied to the side flanges 16 to prevent the end portions of the springs from becoming overlapped. By providing the ends of the springs 19 with means for preventing overlapping when pressure is applied to the side flanges, each spring is braced owing to its looped or arched condition, thereby providing an efficient means for pressing all portions of the tire 8 into contact with the members engaging the outer side of the tire. By thus providing a means for resisting the downward pressure of the side flanges 16, the beads 18 of the tire, or any other portion thereof may be repaired or renewed and vulcanized, as desired. In Figs. 5 and 6 I have shown an application of my improved core which may be used in vulcanizing new tires. The core in this instance is formed annular and made up of the springs 19 attached together by a desirable means, such as the bar 20 and rivets 20', already described. In vulcanizing new tires where the entire tire must be vulcanized at once, a mold such as shown in Figs. 1 and 2, is impractical. In vulcanizing the complete tire the flanges 16 are preferably made in annular form and adapted to fit the beads and bead portions of the tire in the same manner as already indicated in connection with Fig. 1. The pressure is placed on the tire and side flanges 16 in any desirable manner. I have indicated a wrapping 25 which effectively produces the required pressure by placing the wrapping under sufficient tension when it is applied to the tire and flanges to place sufficient pressure on the tire to make the latter vulcanize properly. The complete tire is equipped with the annular core, flanges and wrapping 25 and then placed in a proper vulcanizer, such as the ordinary open steam vulcanizer, and vulcanized in the usual manner.

In Fig. 1 I have shown the spring members 19 as being substantially cylindrical and not in direct engagement with the side flanges 16. This form of springs is very desirable for presses where a single size of tire is vulcanized, but where the tires vary slightly, it will be found that they all do not fit snugly in the device. Therefore, in Fig. 2 I have shown the flanges 16 and spring 19 formed in manners so that if there is a slight variation in the sizes of the tires 8, such different sizes will be accommodated by the bead portions extending farther up toward the angular portion 26 of the springs 19. This form of spring also has the advantage of having a direct engagement with the flanges 16 so that when the flanges are pressed downwardly in the mold wall 7 they exert pressure on the springs also and help to press the springs outwardly along with the downward pressure of the side flanges on the beads and portions adjacent the beads of the tire.

In Figs. 4 and 6 I have indicated the end portions 24 of the spring members 19 as not being secured together, but bent inwardly of the loop of the spring and adapted to engage each other to brace the top of the spring when pressure is applied in use. This has the advantage of making a more flexible construction than the forms shown in Figs. 1 and 2, and also provides more flexible means for accommodating tires which vary slightly in thickness and size. This form of spring may be formed, as shown in Fig. 4, to fit into side flanges, such as indicated in Fig. 1, or it may be that the side flanges are formed with portions 27 cut away, as in Fig. 2, where the flanges have direct contact with the ends of the springs 19 and thereby exert pressure on the spring along with the pressure applied to the tire portions, see Fig. 6.

I claim:—

1. In combination, a tire mold; bead molds in the tire mold; a core comprising a plurality of individual springs attached together and disposed in said tire mold, there being a tire space between the tire mold and bead molds and said core, and a portion of each spring of said core engaging said bead molds; and clamping means engaging said bead molds and core for compressing a tire in said tire space.

2. In combination, a tire core comprising a plurality of sheet metal springs with each spring disposed in loop form; and bead molds engaging portions of said core and beads and portions adjacent the beads of a tire adapted to clamp such tire tightly on said core.

3. In combination, a pair of bead molds adapted to engage bead portions of a tire; and a tire core consisting of a plurality of springs joined together with portions extending from the latter into engagement with said bead molds.

4. A tire core comprising a plurality of springs disposed in loop form and attached together, there being a portion at each end of each spring extending inwardly of the loop providing means for preventing the springs from overlapping each other.

5. A tire core comprising a plurality of sheet metal springs disposed in loop form with the end portions of each spring adjacent each other; means securing intermediate portions of the springs together; and means preventing the overlapping of the end portions of the springs when pressure is applied to the latter.

6. In combination, two coöperating tire bead molds having bead grooves therein with cut-away portions between the bead grooves; and a tire core comprising a plurality of springs in loop form joined together at intermediate portions and having a portion engaging said cut-away portions of the bead molds.

7. In combination, a pair of bead molds having bead grooves therein; and a tire core made up of a plurality of springs with each spring engaging the bead molds between said bead grooves.

8. In combination, a pair of bead molds having bead grooves therein; a tire core made up of a plurality of springs with each spring engaging the bead molds between said bead grooves; and means adapted to exert pressure on bead molds and pressing the latter toward said core.

9. In combination, a tire mold; a pair of bead molds in the tire mold having spaced tire bead grooves for engaging the beads of a tire; a tire core made up of a plurality of springs joined together in the tire mold and providing a tire space between such tire core and tire mold, there being portions of the tire core engaging the bead molds between said bead grooves; and means for pressing the bead molds toward the bottom of the tire mold and against the core.

In testimony whereof I have signed my name to this specification on this 4th day of January, A. D. 1919.

JACOB J. WOHLGEMUTH.

Copies of this patent may be obtained for five cents each, by addressing the "Commissioner of Patents, Washington, D. C."